(12) United States Patent
Quinn et al.

(10) Patent No.: US 7,606,831 B2
(45) Date of Patent: Oct. 20, 2009

(54) UNIQUE IDENTIFICATION LABELING METHOD AND SYSTEM

(75) Inventors: Brian R. Quinn, Safety Harbor, FL (US); Cynthia J. O'Connell, Lakeville, MN (US); Jeffrey J. Green, Clearwater, FL (US); Robert T. Strawbridge, Odessa, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 295 days.

(21) Appl. No.: 10/919,046

(22) Filed: Aug. 16, 2004

(65) Prior Publication Data

US 2006/0026197 A1 Feb. 2, 2006

Related U.S. Application Data

(60) Provisional application No. 60/587,297, filed on Jul. 12, 2004.

(51) Int. Cl.
*G06F 17/30* (2006.01)
(52) U.S. Cl. .................................................. 707/104.1
(58) Field of Classification Search ...................... 707/1, 707/2, 9, 10, 104.1; 235/494; 705/26
See application file for complete search history.

(56) References Cited

U.S. PATENT DOCUMENTS 6,850,900 B1 * 2/2005 Hare et al. .................... 705/26

| | | | |
|---|---|---|---|
| 2003/0115162 A1 | 6/2003 | Konick | 705/404 |
| 2003/0158791 A1 * | 8/2003 | Gilberto et al. | 705/27 |
| 2003/0182622 A1 * | 9/2003 | Sibal et al. | 715/511 |
| 2004/0074977 A1 * | 4/2004 | Rainey et al. | 235/494 |
| 2004/0125405 A1 | 7/2004 | Salomon et al. | 358/1.18 |

OTHER PUBLICATIONS

"Department of Defense Standard of Practice —Identification Marking of U.S. Military Property", Oct. 10, 2003, pp. ii, 1-30.
Stamps.com; Various pages from the Stamps.com web-site; http://www.stamps.com; Date of publication unknown.

* cited by examiner

*Primary Examiner*—Etienne P LeRoux
(74) *Attorney, Agent, or Firm*—Marsh Fischmann & Breyfogle LLP

(57) ABSTRACT

A system and method for automatically generating a plurality of unique identification labels including accessing inputable computerized record fields, including a predetermined required field and a user-definable field, inputting data into at least the predetermined required field in corresponding relation to one or more objects, optionally entering data into a user-definable field for an object, and automatically generating an object information file employable for generating a plurality of unique identification labels in corresponding one-to-one relation to the plurality of objects, wherein the object information file comprises information corresponding to a plurality of unique object identification codes, each of said plurality of unique object identification codes corresponding to said data inputted into the predetermined required fields and/or user-defined fields for a corresponding one of said plurality of objects.

49 Claims, 13 Drawing Sheets

Pending Labels Menu

Enter one of the following:   (Partial values may be entered)

Unique Identification Code: [ ]

Predetermined 1: [ 234 ]

User Definable 1: [ ]

User Definable 2: [ ]

— 710

Lookup — 750

Print Selected Labels — 760

| Unique Identification Code | Predetermined 1 | User Definable 1 | User Definable 2 |
|---|---|---|---|
| ☐ 0123456789-000000010 | 1234 | 1098765-432.100 | ABC1234 |
| ☐ 0123456789-000000020 | 2234 | 1098765-432.200 | ABC1234 |
| ☐ 0123456789-000000030 | 3234 | 1098765-432.300 | ABC1234 |
| ☐ 0123456789-000000040 | 4234 | 1098765-432.400 | ABC1234 |
| ☐ 0123456789-000000050 | 5234 | 1098765-432.500 | ABC1234 |
| ☐ 0123456789-000000060 | 6234 | 1098765-432.600 | ABC1234 |
| ☐ 0123456789-000000070 | 7234 | 1098765-432.700 | ABC1234 |

Print Label

Unique Indentification Code: 0123456789-9876543210 — 810

| | | | | |
|---|---|---|---|---|
| Description: | ABC1 | Start Date: | End Date: | |
| PDS Type: | | Work Center: 876 | Project: | ABC1234 |
| Work Order: | DE5678 | Program: ABC1234 | PL Rev: | A |

Purchaser Data

| | | | | |
|---|---|---|---|---|
| Part Number: | 123457-000 002 | Serial: 4321 | Eng Cage: | |
| Eng Cage: | | | | |

[Print Label] — 820

Site XYZ - 1.0x2.0 Label

Third Party Data Send Menu

Enter one of the following: (Partial values may be entered)

Unique Identification Code: _____

Predetermined 1: abc1

User Definable 1: _____

Lookup

Filters: ○ View Unsent Items  ○ View Sent Items  ○ View All

☐ Select All  ☐ Clear All

Create Data File

| | Unique Identification Code | User Definable 1 | Serial | Work Order | Predetermined 1 | Already Sent? | Date Sent |
|---|---|---|---|---|---|---|---|
| ☐ | 123456789-000000010 | 1098765-432 100 | | ABCDEF | ABC1234 | | |
| ☐ | 123456789-000000020 | 1098765-432 100 | 2234 | ABCDEF | ABC1234 | | |
| ☐ | 123456789-000000030 | 1098765-432 100 | 3234 | ABCDEF | ABC1234 | | |
| ☐ | 123456789-000000040 | 1098765-432 100 | 4234 | ABCDEF | ABC1234 | | |
| ☐ | 123456789-000000050 | 1098765-432 100 | 5234 | ABCDEF | ABC1234 | | |
| ☐ | 123456789-000000060 | 1098765-432 100 | 6234 | ABCDEF | ABC1234 | | |
| ☐ | 123456789-000000070 | 1098765-432 100 | 7234 | ABCDEF | ABC1234 | | |
| | | 1098765-432 100 | 8234 | ABCDEF | ABC1234 | | |

Page 1 of N

Fig. 9

UNIQUE IDENTIFICATION LABELING METHOD AND SYSTEM

CROSS-REFERENCE TO RELATED APPLICATIONS

This application claims priority to U.S. Provisional Application No. 60/587,297, filed Jul. 12, 2004, the contents of which are incorporated herein by reference in their entirety.

FIELD OF THE INVENTION

The present invention relates to a method and system for generating uniquely identifying labels employable with a plurality of objects to uniquely identify each of the objects. In particular, the present invention relates to a system and method for one or more object supplier(s), or source(s), to generate uniquely identifying labels to the requirements of one or more object purchaser(s), while optionally including their own indicia on such labels.

BACKGROUND OF THE INVENTION

Currently, identifying labels are used in a variety of arrangements to help identify particular objects. For example, tracking-type labels (e.g., bar codes) are often used by suppliers (e.g., wholesalers and retailers) to track the amount of inventory/usage of one or more objects.

Conversely, the purchasers of such objects rarely, if ever, have an opportunity to define the label requirements for accounting and/or tracking such objects. This is due in part to practical considerations in that most purchasers (e.g., consumers of household products) do not have a need for tracking the objects they purchase. However, some large end-users (e.g., government entities) may desire or otherwise even require that the objects they purchase be accounted for and tracked with identifying labels that meet their own specific needs. These purchasing entities may generally require a type of indicia not correlated with the indicia used by the object suppliers to track the objects. Therefore, object suppliers and object purchasers often have differing requirements with respect to the tracking labels used on the same object.

Moreover, the systems and methods employed by object suppliers and the systems and methods employed by object purchasers often differ. For example, object suppliers may use software and/or other tracking methods that are different than the software and/or tracking methods used by the third-party purchaser. Thus, it is currently very difficult to integrate both object supplier and object purchaser object label and/or system requirements without substantial expenditures by both parties.

It would be advantageous if a method and/or system existed that enabled object suppliers to generate labels that were compliant with the object purchaser's labeling standards without requiring the object supplier to integrate with the object purchaser's system and/or without requiring the object supplier to purchase proprietary third-party software and/or proprietary third-party printing means to create compliant identifying labels, and vice-versa.

SUMMARY OF THE INVENTION

In view of the foregoing, a primary objective of the present invention is to provide a method and system for generating unique identification labels in a manner that provides for enhanced flexibility so as to better meet the needs of one or more object source(s) and/or one or more object purchasers.

Another objective of the present invention is to provide a method and system for generating unique identification labels in a manner that facilitates network implementations, thereby yielding enhanced efficiencies.

A further objective of the present invention is to provide a method and system that reduces the need for dedicated proprietary software and/or printing means (e.g. at object source locations).

Yet another objective of the present invention is to provide a method and system for generating unique identification labels in a manner that facilitates the utilization of both object source and object purchaser object identification schemes and related data.

An additional objective of the present invention is to provide a method and system for generating unique identification labels in a manner that is user friendly.

One or more of the above objectives and additional advantages are realized by an inventive method and system of the present invention. In one characterization, an inventive method may include the steps of accessing a plurality of inputable computerized record fields that are defined by an object data protocol, and inputting data into one or more of the inputable computerized record fields in corresponding relation to a plurality of objects. Following the inputting step, the method provides for the automatic generation of at least one object information file employable for generating a plurality of unique identification labels in corresponding one-to-one relation to the plurality of objects. The object information file may include information corresponding to a plurality of unique object identification codes and each unique object identification code may comprise a unique set of alphanumeric characters. Each of the plurality of unique object identification codes corresponds to the data inputted into the computerized record fields for a corresponding one of the plurality of objects. For example, each unique object identification code may be employed in a database arrangement where upon identifying the appropriate unique object identification code, data corresponding to the object related to the unique object identification code may be accessed. In this regard, such data may comprise predetermined required field data.

In one aspect, at least a first one of the inputable computerized record fields may be a predetermined required record field, and at least a second one of the inputable computerized record fields may be a user-definable field. Further, multiple predetermined required fields and/or multiple user-definable fields may be established. In conjunction with this aspect, the step of inputting data into the predetermined required record field(s) may be established as a prerequisite to the automatic generation step. By way of primary example, the predetermined required fields may correspond with information required by a given object purchaser and/or a given object source, thereby yielding enhanced organizational compliance with labeling policies that may be established by the object purchaser and/or object source. More generally, the predetermined required field(s) may be established for the input of at least one type of object information, e.g. selected from a group comprising: object-source identifier information, object serial number information, object part number information, object revision number information, object work order information, and object description information. More generally, one or more user-definable field(s) may be established for the corresponding input of the following types of object information: object manufacturer identification information, object manufacturing engineering division information, object purchasing contract information, object data universal numbering system information, object-purchaser object acceptance information, object lot number information, and object shipping information.

In another aspect, the inventive method may include the step of establishing the object data protocol in corresponding separate relation to each of a plurality of object sources, e.g. different product manufacturers. In this regard, it should be appreciated that the present invention advantageously allows a given object source to establish an object data protocol on an initial occasion and to utilize and/or modify the established object data protocol on subsequent occasions, thereby yielding repeat usage and other organizational efficiencies. In conjunction with this aspect, the inventive method may also include the steps of assigning an object-source ID to each of the plurality of object sources, and as part of the accessing step, verifying an object-source ID prior to completion of the inputting and automatic generation steps. Such further steps allow for enhanced control over access to proprietary labeling data and related information that may be employed by a given object source(s). By way of primary example, the assigned object-source ID for each of the object sources may be an electronic signature, such as an IP address, DNS address, digital certificate and/or other similar electronic ID verification types.

In a further aspect, the inventive method may comprise the step of generating, e.g. printing, a plurality of unique identification labels based on the at least one object information file. Each of the unique identification labels may include a first indicia, wherein the first indicia for each of the labels corresponds to a given one of the plurality of unique object identification codes. To facilitate automated reading of the labels, the first indicia may be in a machine readable format. In conjunction with this aspect, the method may further include the step of selecting, prior to the label generation step, a first label template, wherein the first label template defines at least a portion of the first indicia. By way of example, the first label template may be defined by a given object purchaser.

The method may further comprise the step of updating the first label template to create an updated label template, wherein the updated label template includes an updated indicia that is different than the first indicia (e.g., the updated indicia is different than the first indicia). For example, an object purchaser may modify their label requirements and define a new or modified indicia to be used by an object source. In this regard, the object purchaser may modify a computerized preexisting label template file, which may be located at the host computer or the user computer, to include the updated indicia. In this regard, the object purchaser is not required to update an entire label template to accomplish the update.

In conjunction with this aspect, the method may further include the step of attaching each generated unique identification label to a corresponding one of a plurality of objects.

In yet another aspect, the inventive method may comprise the step of entering data into a user-definable field for the plurality of objects, wherein the at least one object information file further includes a plurality of second object identification codes. In one aspect, the second object identification code may comprise a unique set of alphanumeric characters. In this regard, each of the plurality of second object identification codes may be different than each of said plurality of unique object identification codes. Each of the second object identification codes may correspond to data inputted into the user-definable field for a given one of the plurality of objects. For example, each second object identification code may be employed in a database arrangement where upon identifying the appropriate second object identification code, data corresponding to the object related to the second object identification code may be accessed. In this regard, such data may comprise user-definable field data.

Further in this regard, each unique object identification code and second object identification code for a given object may be combined. For example, a master identification code may include a first portion for the unique object identification code and a second portion for the second object identification code, wherein the alphanumeric pattern for each is maintained intact. These first and second portions of the master code may be read in parallel or serial and in any order to derive information corresponding to each of the unique object identification code and the second object identification code.

In conjunction with the above-described step of entering data method may be coupled with a step of designating the user-definable field as another required field, wherein the automatically generating step is completed after completion of the entering step. That is, completion of the entering step may be established as a prerequisite for completion of the automatic generation of the at least one object information file. Further, the method may include the step of providing an indication to a user as to the required nature of the predetermined required field and the another required field in conjunction with the inputting and entering steps, respectively. In this regard, the indication may be provided separately for each of the predetermined required field and the another required field. Also in this regard, the indication for the another required field and the predetermined required field may be different. For example, the indicator for a predetermined required field may be a first visual indicator while the indicator for another required field may be a second visual indicator. In one aspect, the indicators may be audio or visual indicators or a combination of thereof.

In relation to the above-noted aspect, the inventive method may also include the steps of establishing the object data protocol for each of a plurality of object sources, completing the accessing step (i.e. accessing the computerized record fields), inputting step (i.e. inputting data into a predetermined required record field) and entering steps (i.e. entering data into a user-definable record field) separately for each of the plurality of object sources, and carrying out the automatic generation step (i.e. automatic generating of at least one object information file) separately for each of the plurality of object sources. Correspondingly, the method may also include the step of defining the user-definable fields separately for each of the plurality of object sources in relation to corresponding sets of the plurality of objects.

In further relation to the noted aspect, the above-referenced completing step may include the step of using at least one different user computer in corresponding relation to each of said plurality of object sources, and the carrying out step may include the step of employing at least one host computer in relation to all of the plurality of object sources. In this regard, the user computers remotely located relative to the at least one host computer, and for that matter, relative to each other. Correspondingly, the method may further include the step of interconnecting each of the user computers to the at least one host computer via the Internet.

In relation to the last noted aspect, and in a different characterization of the invention, a method and system are provided for generating a plurality of uniquely identifying labels using a network arrangement (e.g., the Internet). In this characterization, the inventive system and method provides for the accessing of a host computer from a user computer via a network arrangement (e.g., use of the Internet wherein the user computer is remotely located from the host computer), and inputting data at the user computer(s) corresponding with a plurality of objects into at least one of a plurality of computerized record input fields. By way of primary example, user computer(s) may be provided in corresponding relation to one or more object source(s) and the inputted data may correspond to information employed by a given object source to uniquely identify each of a plurality of objects supplied by that object source to one or more object purchaser(s). In this characterization, the inventive system and method are adapted for creating a unique object identification code at the host computer for each of the plurality of objects based on the inputted data and automatically generating, after the inputting step, at least one object information file on the host computer, wherein the at least one object information file includes information corresponding to the unique identification code and is employable for the generation of a plurality of unique identification labels.

In conjunction with this characterization, the method may further comprise the step of assigning an object source ID for the object source and verifying that object source ID. In one characterization, the object source ID is verified before the inputting step occurs. By way of example, the object source ID may be verified by comparing inputted data to a stored object source ID value. In one regard, the object source ID may be an electronic signature.

In further relation to the noted aspect, the inventive method may also comprise the step of generating a plurality of unique identification labels based on the object information file, wherein each of the plurality of unique identification labels include a first indicia. In one approach, the plurality of unique identification labels are generated at a user location. In this regard, the plurality of unique identification labels may be printed by a user printing means interconnectable to a user computer. Further in this regard, the first indicia of the plurality of unique identification labels is unique for each of the plurality of unique identification labels. Also in this regard, the first indicia of the plurality of unique identification labels also corresponds to a given one of the plurality of unique object identification codes. For example, each indicia may contain information that is directly related to the object unique object identification code, such as a pattern that enables a user to derive the unique object identification code therefrom. In relation to the noted aspect, the method may further comprise the step of attaching each of the generated plurality of unique identification labels to a corresponding one of the plurality of objects.

In yet another aspect, the plurality of unique identification labels may each comprise a second indicia that is unique for each of the plurality of unique identification labels. In this aspect, the first indicia may correspond to a unique object identification code and the second indicia may correspond to the second object identification code.

In a further aspect, the inventive method may also comprise the step of changing the indicia to create an updated indicia, for example, upon receipt of instructions from an object purchaser. In this regard, the method may further comprise the step of uploading information corresponding to the updated indicia to the host computer. In one aspect, the uploading may comprise the use of a network arrangement (e.g., the Internet).

In another aspect, the inventive method may comprise the step of generating a report using the object information file, wherein the report includes information based on at least one of the plurality of unique object identification codes. In one aspect, the report may be generated by a user computer at a user location.

In another aspect, the inventive method may include the step of transferring information corresponding to information contained in the at least one object identification file to the user computer using a network arrangement to generate the uniquely identifying labels. By way of example, the information corresponding to information contained in the at least one object information file may be another file employable by a user computer to print the plurality of uniquely identifying labels (e.g., a print file). In this regard, the transferring may comprise the use of the Internet. Further in this regard, the transferring may include generating the print information at the host computer, sending the print file to the user computer and generating the plurality of uniquely identifying labels using a print means interconnectable to the user computer.

In yet another aspect, the inventive method may include the step of transmitting, prior to the creating step, the inputted data from the user computer to the host computer using the network arrangement.

In yet another aspect, the method may comprise the steps of establishing an object data protocol separately for each of a plurality of object sources, wherein each object data protocol comprises the use of a plurality of computerized input fields, and wherein the plurality of computerized input fields comprise a plurality of predetermined required fields and one or more user-definable fields. Further in this regard, the method may comprise defining one or more user-definable fields separately for each of the plurality of object sources in relation to corresponding sets of the plurality of objects, wherein a set of user-definable fields corresponds with data employed by a corresponding one of the plurality of object sources to uniquely identify the corresponding sets of the plurality of objects, and wherein the defining step is completed before said inputting step (e.g., each object source decides which data fields should be used to integrate its current object management techniques with the system before data is inputted into the system).

In this regard, the establishing may comprise transferring a data file from the user computer to the host computer, wherein the data file includes the information necessary to create the object data protocol comprising the user-definable fields for the specific object source. In another aspect, the object source may communicate the desired user-definable fields to a host computer administrator, wherein such user-definable fields are thereafter integrated with the host computer to create the object data protocol for the specific object source.

In yet another aspect, the object data protocol may define at least a portion of the graphical screen display environment.

In relation to the above-noted aspect, the inventive method may further comprise the steps of a first entering of data into the predetermined required fields and a second entering of data into the user-definable fields. In this regard, the method may further comprise the steps of completing the accessing and first entering step separately for each of the plurality of objects sources and carrying out the automatically generating step separately for each of the plurality of object sources.

In yet another aspect, the completing step may further comprise the step of effecting said second entering step separately for each of the plurality of object sources (e.g., two different user groups at a corresponding two different user computers).

In yet another regard, the inputting step of the present inventive method may comprise the use of computerized input boxes corresponding to the plurality of predetermined required fields and the one or more user-definable fields. In this regard, the inputting step may otherwise comprise the step of uploading data into at least one of said plurality of predetermined required fields and said one of user-definable fields. For example, information corresponding to such computerized input boxes may be transferred from the host computer to generate a graphical screen with such computerized input boxes at the user computer. The user may enter data into such computerized input boxes and such data may, upon receiving the appropriate indicator from the user, be transmitted to the host computer. The transmitted data may be used by the host computer to create the unique object identification codes, object information file, and/or unique identification labels, among others.

In yet another aspect, the inventive method may further comprise the step of defining said user-definable fields separately for each of the plurality of object sources in relation to a corresponding set of a plurality of objects. In this regard, the defining step is completed before the inputting step for each of the plurality of object sources.

In another aspect, the inventive method may further comprise the step of designating at least one user-definable field as another required field. In this regard, the inventive method may further comprise providing an indication to the user as to the required nature of at least one of said predetermined required fields and said another required field in conjunction with the inputting step.

In yet another aspect, the user-definable fields of the present method generally correspond with data employed by the object source to uniquely identify each of the plurality of objects. In this aspect, the method may comprise the steps of defining the user-definable fields at the user computer to create a user definition file, transferring the user definition file to the host computer using a network arrangement, and integrating the user definition file with at least one of the plurality of inputable computerized record fields to create an object data protocol. In this regard, the user computer may be associated with an object source.

In a different characterization of the invention, a method and system are provided for generating a uniquely identifiable label for each of a plurality of objects. In this characterization, the inventive method and system provide for a host computer that is interconnectable in a network arrangement (e.g., the Internet). In this regard, the host computer is adapted to receive data in a plurality of predetermined required fields and one or more user-definable fields. Further with this regard, the host computer is further adapted to generate an object information file that corresponds to data input with respect to at least one of the plurality of pre-determined required fields. In this regard, the object information file may be employable by an object source to generate a plurality of unique identification labels and correspondence one-to-one relation for each of a plurality of objects. In this regard, at least one of the plurality of predetermined required fields is defined by an object purchaser. Also included in the present characterization of method and system is a user computer interconnectable and located remote from the host computer. In this aspect, the user computer is adapted for the input of data into at least the plurality of predetermined required fields. Further, the user computer may be adapted to transfer the inputted data to the host computer.

In one aspect, the host computer may comprise an application module adapted to receive data in the plurality of predetermined required fields. In this regard, the application module may be further adapted to generate a plurality of unique object identification codes based on data input into at least one of the plurality of predetermined required fields, wherein each of the plurality of unique object identification codes corresponds in a one-to-one relationship for each of the plurality of objects. Further in this regard, the application module may be further adapted to generate the object information file, wherein the object information file includes at least one of the plurality of unique object codes.

In yet another aspect, an inventive system may comprise a user interface generation module that is adapted to display at least one graphical screen. In this aspect, the graphical screen may comprise a plurality of computerized input boxes that are adapted for inputting data which corresponds to at least one of the plurality of predetermined required fields. Further, the plurality of computerized input boxes may be adapted for the input of data that corresponds to one or more of the user-definable fields.

In yet another aspect, the plurality of predetermined required fields may include a first indicator to indicate to a user the nature of the predetermined required fields.

In yet another aspect, the at least one user-definable field may include a second indicator to indicate to the user the nature of one or more of the user-definable fields. Further in this regard, the first indicator and second indicator may be identical. In yet another aspect, at least one of the first indicator and second indicator is a visual indicator. In yet another aspect, at least one of the first indicator and second indicator is an audio indicator.

In yet another aspect, the inventive system may comprise a host computer comprising a database module that is adapted for storing data corresponding to a plurality of predetermined required fields and the one or more user-definable fields. In this regard, the host computer may further comprise a user identification module that is adapted to verify the identity of a user based on an assigned object-source ID value stored in the database module.

Another characterization of the invention includes a system and method for generating a plurality of unique identification labels, wherein the system includes a host computer interconnectable in a network arrangement. In this regard, the host computer may be adapted to receive data in one or more predetermined required fields and one or more user-definable fields, wherein the host computer is further adapted to generate an object information file that corresponds to the data input with respect to at least the predetermined required fields. In this regard, the user-definable fields may be stored separately by the host computer in relation to a corresponding one of the plurality of object sources, (e.g., the database module may store each user group's object data protocol, including the user-definable fields, separately).

In yet another aspect, the user-definable fields are definable by a corresponding one of a plurality of object sources in relation to a set of plurality of objects. Further in this regard, the object information file may be employable by a given one of the object sources to generate a plurality of unique identification labels in corresponding one-to-one relation to the set of plurality of objects. The inventive system may further comprise a user computer interconnectable to and located remote from the host computer. In this aspect, the user computer may be adapted for the input of data into at least the predetermined required fields. Further in this regard, the user computer may be adapted to transfer the inputted data to the host computer.

In another characterization, the inventive system may include a host computer interconnectable in a network arrangement. In this regard, the host computer may be adapted to receive data in one or more predetermined required fields and one or more user-definable fields, wherein the host computer is further adapted to generate an object information file corresponding to data input with respect to at least the predetermined required fields. Further in this aspect, the object information file may be employable by an object source to generate the plurality of unique identification labels and corresponding one-to-one relation for each of a plurality of objects. Further in this regard, the unique identification labels may comprise a first indicia that is at least partially defined by an object purchaser.

The inventive system may further comprise a user computer that is interconnectable to and located remote from the host computer. In this aspect, the user computer is adapted for the input of data into at least the predetermined required fields. Further, the user computer may be adapted to transfer the inputted data to the host computer. In another aspect, the unique identification labels may comprise a second indicia that is at least partially defined by the object source.

In another characterization of the present invention, a system is provided that comprises a host computer that is interconnectable in a network arrangement. The host computer may be adapted to receive data in one or more predetermined required fields and one or more user-definable fields, wherein the host computer is further adapted to generate an object information file corresponding to data input with respect to at lest the predetermined required fields.

In another aspect, the object information file is employable by an object source to generate a plurality of unique identification labels that correspond in a one-to-one relation for each of a plurality of objects. In this aspect, at least one of the user-definable fields is designated as a required field by an object source. Further in this regard, the system may include a user computer interconnectable to and located remote from the host computer. Further in this aspect, the user computer is adapted for the input of data into at least a predetermined required fields. Further in this aspect, the user computer may be adapted to transfer the inputted data to the host computer.

Of note, the system and method may also provide for the transfer of data comprising the at least one object identification file from the host computer to a user computer using the Internet. In turn, the transferred data may be employed by the user computer to generate unique identification labels for each of a plurality of objects.

As will be appreciated, each of the noted aspects and features discussed above may be implemented in a network arrangement method and system in any desired combinative characterization.

Additional aspects and corresponding advantages of the present invention will become apparent to those skilled in the art in conjunction with the further description that follows.

BRIEF DESCRIPTION OF THE DRAWINGS

FIG. 7 illustrates one embodiment of a graphical screen employable with the present invention.

FIG. 8 illustrates one embodiment of a graphical screen employable with the present invention.

FIG. 9 illustrates one embodiment of a graphical screen employable with the present invention.

DETAILED DESCRIPTION OF THE INVENTION

The present invention relates to a system for generating uniquely identifying labels and a method for accomplishing the same. The system may generally include a host computer interconnected in a network arrangement with a plurality of remote computers. The network arrangement as described herein generally includes the use of the Internet. However, it should be understood that other network arrangements, for example, an intranet or extranet, may also be employed to generate the uniquely identifying labels. It is also contemplated that the system and method could be practiced with a single computer interconnected to a user interface.

Figure 1:
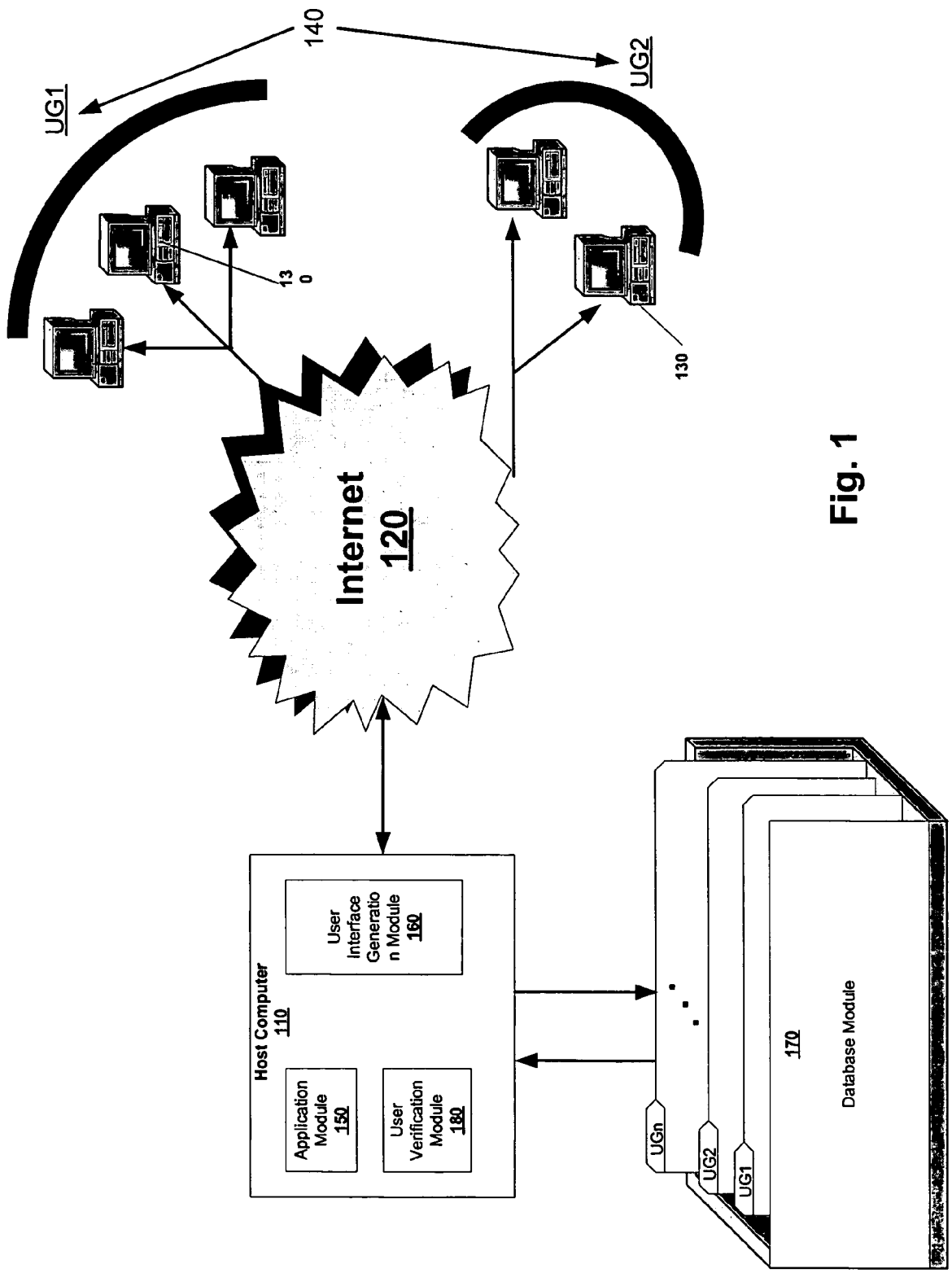
FIG. 1 illustrates a system useful in accordance with the present invention.

One embodiment of the system is depicted in FIG. 1. The host computer (110) is interconnected via the Internet (120) to a plurality of remote computers (130). The remote computers (130) are interconnectable with the host computer (110), and different sets of remote computers (130) are associated with specific user groups (140). Each user group (140) is generally interrelated as a common object source and associated with a set of objects that require uniquely identifying labels. For example, each user group may be a manufacturer of goods purchasable by a third-party, wherein the third-party requires that the goods be individually labeled and uniquely identified. As depicted, each user group (140) includes a plurality of remote computers (130). However, it is contemplated that a user group (140) could only comprise a single computer. The host computer (110) generally includes a application module (150), a user interface generation module (160), a database module (170), and a user verification module (180).

The application module (150) generally includes database software displayable by the user interface generation module (160). The database software generally includes a plurality of inputable computerized record fields. These plurality of inputable computerized record fields are generally stored in the database module (170), described below, and are accessible by the remote computer (130). As will be discussed below, these plurality of inputable computerized record fields are populatable to receive data corresponding to individual objects. Generally, the inputable computerized record fields include at least one predetermined required field, as discussed below, and one user-definable field, as discussed below.

The application module (150) is also generally capable of generating unique object identification codes, which uniquely correspond with an object, as discussed below. The application module (150) is additionally generally capable of generating an object information file. The object information file, discussed below, generally includes the unique object identification codes. Of note, the object information file may be used to generate the uniquely identifying ("UID") labels. As used herein, the acronym "UID" means "uniquely identifying", "unique identifying", "uniquely identified" and similar such terms.

UID labels are generated using the information contained in the object information file. The generatable UID labels generally include a first indicia to uniquely identify the object they correspond with. This first indicia may be in a machine-readable format, such as a barcode, or may be in a human readable format. The first indicia generally corresponds to the unique object identification code for each respective object, and may also be associated with other object data, such as data corresponding to the user-definable fields.

In one embodiment, each UID label comprises a first indicia corresponding to a unique identification code, wherein the first indicia is defined, at least in part, by an object purchaser. In another embodiment, the UID labels comprise a second indicia corresponding to user-definable field data, wherein said second indicia is defined, at least in part, by an object source.

The uniquely identifying labels may be in any format that enables the objects associated therewith to appropriately display the indicia. Generally, the format of the uniquely identifying labels is determined by a party other than the object source. In one embodiment, the label format is determined by an object purchaser.

Figure 2A:
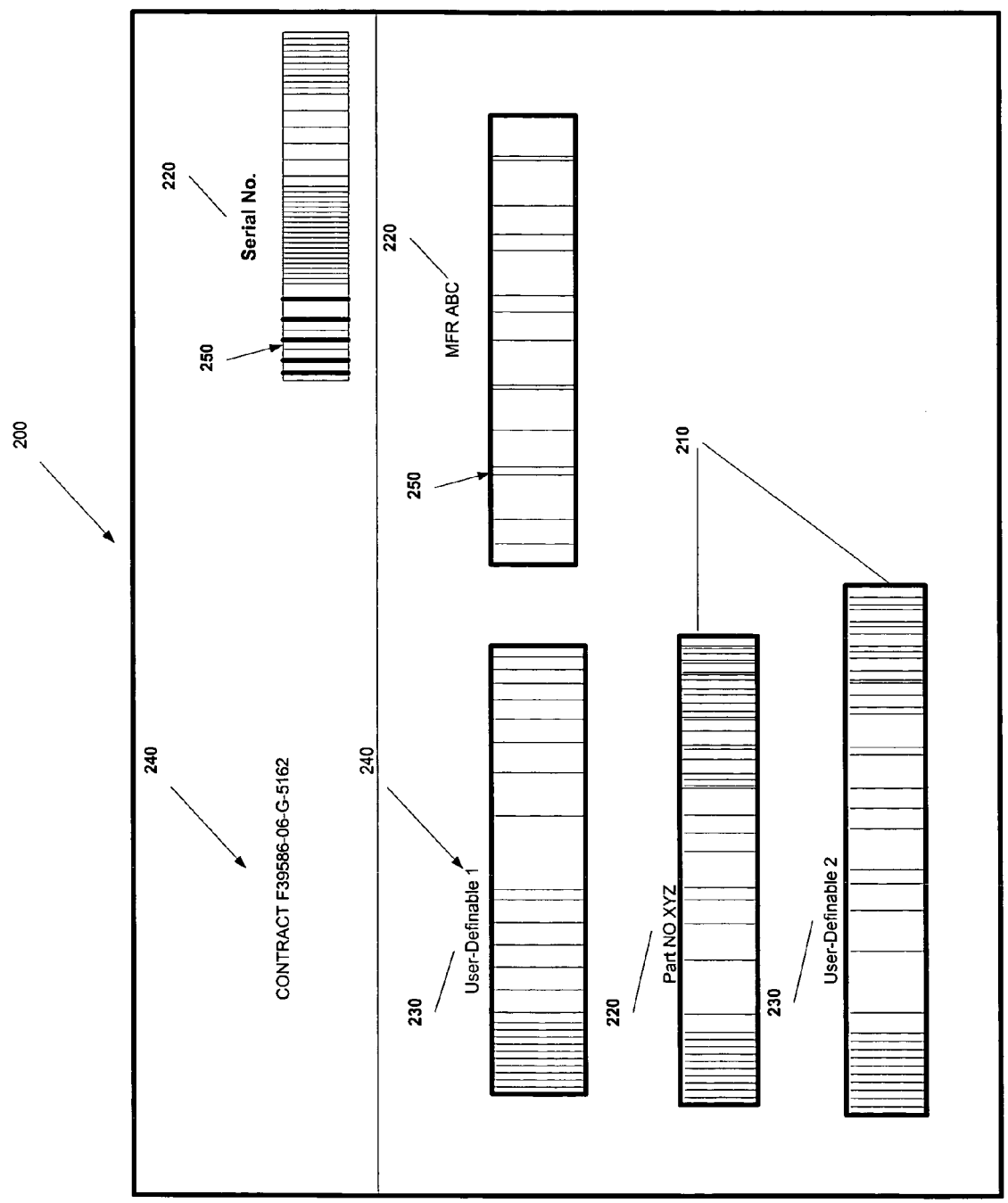
FIG. 2A illustrates a uniquely identifying label in accordance with the present invention.

One example of a UID label comprising identifying indicia is depicted in FIG. 2A. The uniquely identifying label (200A) generally includes indicia (210A). The indicia may correspond with predetermined required field information (220) or, optionally, with user-definable field information (230). The UID label may include indicia in a one-dimensional machine-readable format (250), a human readable format (240) and combinations thereof.

Figure 2B:
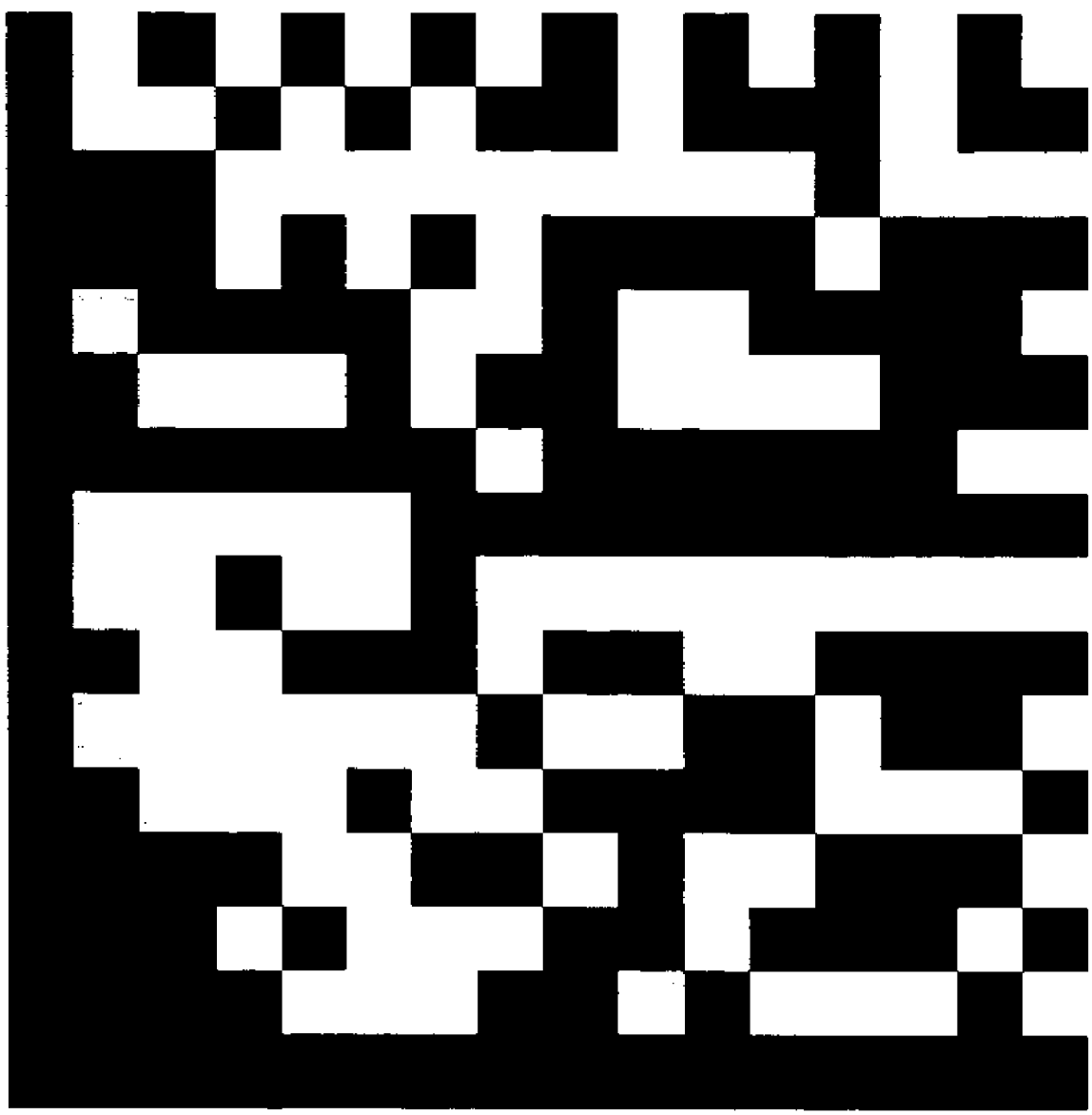
FIG. 2B illustrates a uniquely identifying label in accordance with the present invention.

Another example of a UID label comprising identifying indicia is depicted in FIG. 2B. The uniquely identifying label comprises indicia (210B) in a two-dimensional machine-readable format.

While FIGS. 2A and 2B depict the machine-readable format as being one-dimensional and two-dimensional respectively, it is contemplated that the machine-readable format may be any known in the art, including barcodes and RFIDs, and in conformance with any industry standard (e.g., ANSI). The barcodes may also be bidirectional (e.g. capable of being read backwards and forwards) or omni-directional (can be read in any orientation relative to the scanner). As used herein, the term "one-dimensional" means a machine-readable format that needs only be read in one dimension (e.g. horizontal) to communicate its content. As used herein, the term "two-dimensional" means a machine-readable format that must be read in two-dimensions (e.g. both horizontal and vertical) to communicate its content.

Referring back to FIG. 1, the user interface generation module (160) of the host computer (110) generally is capable of generating graphical screens to display the plurality of inputable computerized record fields. The user interface generation module may be any known in the art, including MICROSOFT WINDOWS (Microsoft Corporation, One Microsoft Way, Redmond, Wash. 98052), UNIX (SCO Group, Inc., 355 South 520 West, Suite 100, Lindon, Utah 84042), MACINTOSH (Apple Computer, Inc., 1 Infinite Loop, Cupertino, Calif. 95014) and other proprietary or open-source type operating systems (e.g., Linux) employable to generate the graphical screens.

The database module (170) of the host computer (110) is generally capable of storing information specific to each user group (140). For example, the database module (170) may store database software, wherein the specific files associated with the database software may be recalled based on the identity of the user group (140) accessing the host computer (110). These specific files may include information regarding user-definable fields corresponding to each specific user group (140) and/or predetermined required fields. The database module (170) is also generally capable of storing user group identification values that independently identify each user group (140) and enable the user group (140) to access the appropriate portions of the application module (150).

The user verification module (180) of the host computer (110) is generally capable of verifying the identity of each specific user group (140) associated with the application module (150). The user verification module (180) generally verifies identity by using the user group identification values stored in the database module (170). The user group identification values are generally compared against an input from the user group (140) prior to enabling the user group (140) to access the application module (150). The user group identification values are generally determined/set-up by the host computer administrator. The user group identification values may be passwords set-up by the user group (140) and/or host administrator. The passwords may be verified using data entry via the user interface prior to enabling access to the application module (150).

In another embodiment, the user group identification values may be electronic signatures associated with the user group (140) that are verified by the host computer (110) independent of any input by the user group (140). For example, the electronic signatures may be an Internet Protocol ("IP") address, a domain name server address ("DNS"), a digital certificate and others known in the art.

It is also contemplated that more than one type of user from a single user group (140) may access the host computer (110) to generate the UID labels. For example, the user group may include a plurality of divisions/affiliates, each of which have their own internal object identification and/or tracking systems. Thus, appropriate environmental codes are generally available and may be assigned to the user group (140) to differentiate each type of user within a user group (140). These environmental codes may be used in conjunction with the object data protocol, discussed below, to recall the user-definable fields for each type of user within the user group. While the term "user" is used above to indicate one in a plurality of user groups, the term user is used broadly throughout the application. For example, user may refer to a person using or accessing a host computer irrespective of the number of entities associated with a user group.

Upon establishing access to the host computer (110) and the corresponding application module (150), an object data protocol may be established by the user group (140). As noted above, the inputable computerized record fields are populatable to receive data corresponding to individual objects and may include both predetermined required fields and user-definable fields. The predetermined required fields are generally fields that must be populated with data to enable generation of the UID labels. The predetermined required fields may be mapped to data employed by the user group (140) to establish the object data protocol. Generally, the predetermined required fields are mapped to data employed by the user group (140) upon establishing the user group identification. Non-exhaustive examples of predetermined required fields include object part number, object serial number, object source identifier information, object revision number, object work order information, and object description information. In other words, the predetermined required fields enable a user group (140) to interface their existing object management software with the application module (150) to generate UID labels without the need for proprietary software or printing means specifically associated with the UID labels. Non-exhaustive example of user-definable fields include object manufacturer identification information, object manufacturing engineering division information, object purchasing contract information, object data universal numbering system information, object-purchaser object acceptance information, object lot number information, and object shipping information.

While use of the predetermined required fields alone may minimally suffice in some cases to enable the user group (140) to generate the UID labels, in many instances the user group (140) will require the tracking and/or identification of objects based on additional and/or different types of information than the requirements of the third-party. Therefore, use of the predetermined required fields alone, in some instances, does not meet the requirements of the user group (140). Therefore, the object data protocol also enables a user group to define one or more user-definable fields to their requirements.

Generally, the user-definable fields are defined by the user group (140) to match data employed by the user group (140) to track and/or identify their objects. The user definable fields generally do not include types of information used in the employed in the predetermined required fields. Thus, the user definable fields enable data specific to the user group (140) to be added/updated/maintained at the host computer (110). Moreover, the user-definable fields employed in the object data protocol enable the user group (140) to track objects associated with a unique objection identification code by data other than that corresponding with the predetermined required fields. Additionally, the user-definable fields, in conjunction with the pre-determined required fields, enable the user group (140) to generate UID labels with currently existing object management software to the object purchaser's requirement and, optionally, to the requirements of the user group (140).

In one embodiment, the user-definable fields are defined by the user group as requiring data entry. In other words, the user group can define the object data protocol such that one or more user-definable fields must be populated with data prior to enabling generation of the unique object identification code, the UID labels, and/or the object information file among others. As discussed below, the object data protocol may be defined such that the predetermined required fields and/or user-definable field that require data include indicators to signal the user that they require data entry.

After the object data protocol has been defined, the user group (140) may populate the inputable computerized record fields associated with the user group's object data protocol to enable generation of a unique object identification code for each object. The unique object identification codes are used in an object information file to generate UID labels.

Figure 3:
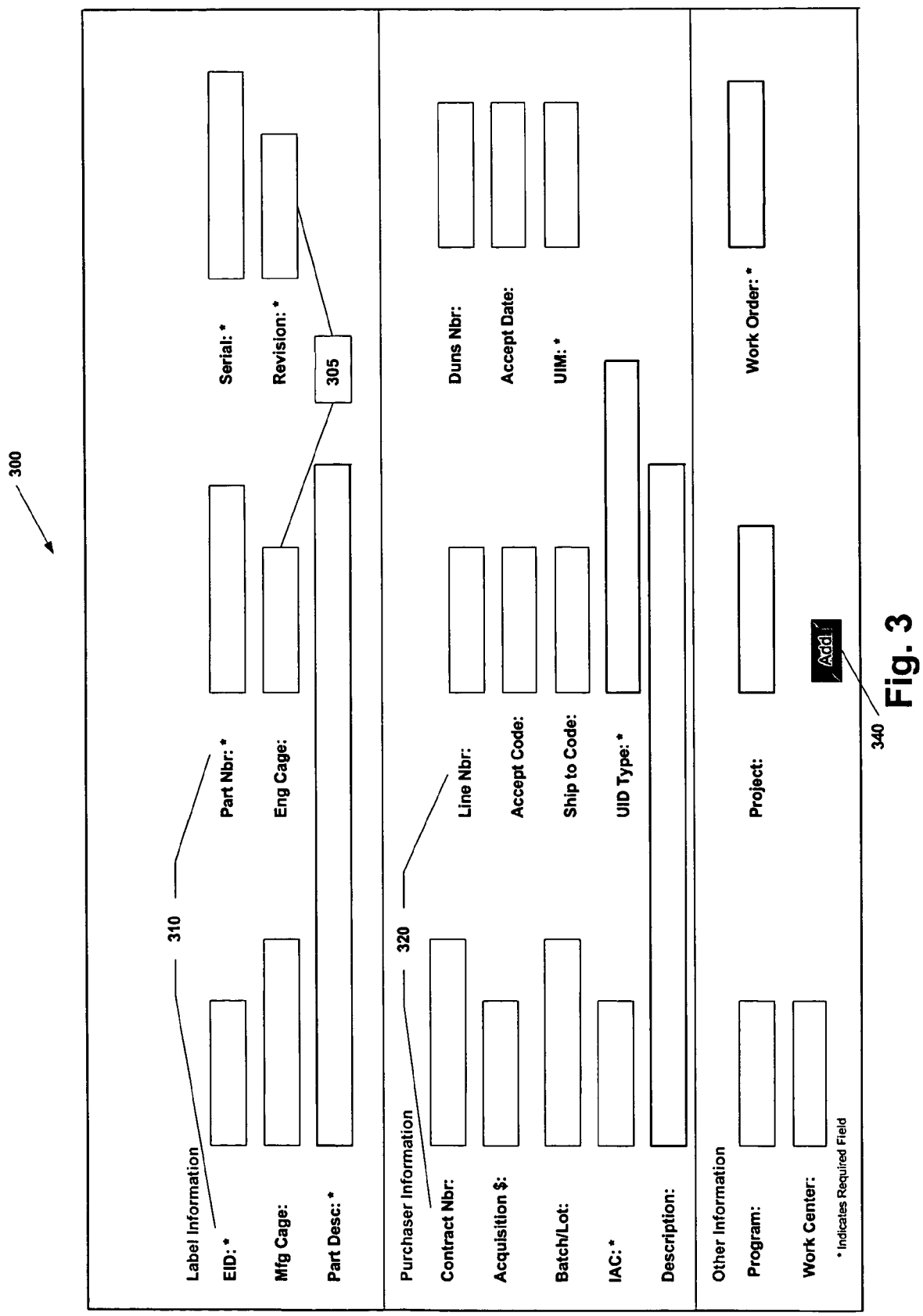
FIG. 3 illustrates one embodiment of a graphical screen employable with the present invention.

Population of the inputable computerized record fields may be accomplished in a variety of ways. In one approach, data for each object may be inputted by the user group (140) into computerized input boxes corresponding to the inputable computerized record fields. The computerized input boxes are generally displayed using the user interface generation module (160) in conjunction with the application module (150). In this regard, the object data protocol, when used in conjunction with the user interface generation module (160), may operate to generate a graphical screen that may be unique to the specific user group (140) based on the user-definable fields employed by the user group (140). One example of such a graphical screen is depicted in FIG. 3.

The graphical screen (300) includes computerized input boxes (305) that correspond with the inputable computerized record fields associated with the user group. In one embodiment, the predetermined required fields are depicted with an indicator (310) (e.g. a visual or audio indicator) to signal to the user group (140) that such fields are predetermined required fields and/or user-definable fields that require data entry. In another approach, fields without an indicator (320) may be used to signal to the user group (140) that such fields do not require data entry. After entry of the requisite data in the computerized input boxes, the object data may be integrated with the application module (150) by using the Add button (340) (e.g., via pointing and clicking).

In another approach, the inputable computerized record fields may be populated by uploading a file containing the necessary object data to the host computer (110). After uploading, the file may be integrated with the application module (150) associated with the user group (140). The user interface generation module (160) may be used to generate a graphical screen that assists the user group in uploading the file to the host computer (110).

Figure 4:
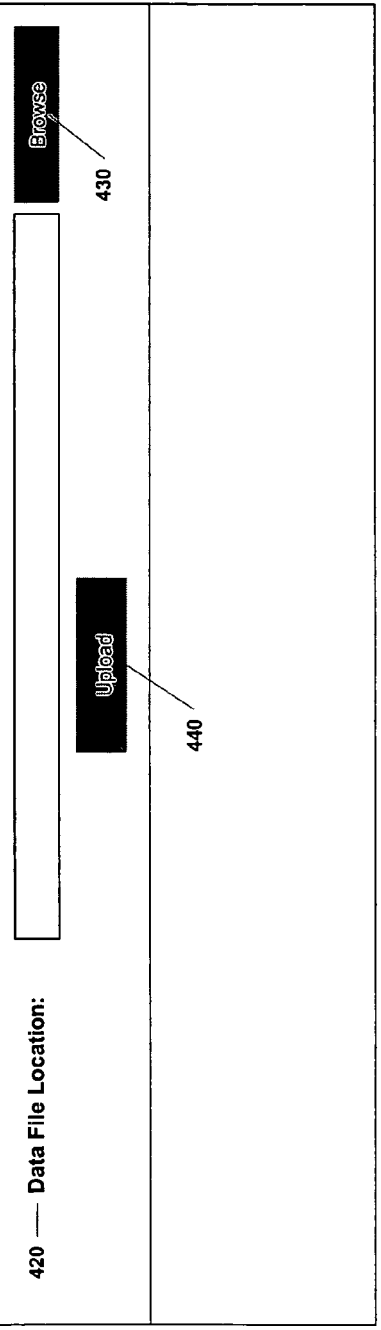
FIG. 4 illustrates one embodiment of a graphical screen employable with the present invention.

In this regard, an example of one such graphical screen is depicted in FIG. 4. Generally, the file-upload graphical screen (400) includes a data file location input box (420) to designate the location of the uploadable data file. In one approach, the data file is located and stored in the data file location input box (420) using standard computer browsing techniques by using the Browser button (430). After the location of the data file has been populated in the data file location input box (420), it may be sent to the host computer (110) by using the Upload button (440). In one approach, the data file uploaded is in a specific format to be integrated with the application module (150). In one embodiment, the data file is in a spreadsheet, text, XML and/or delimited format. Other formats known in the art may also be employed.

In one approach, a specific data entry template may be downloaded to the remote computer (130) to enable the user group (140) to enter data in accordance with the required file format. The user interface generation module (160) may be used in accordance with the appropriate user group identification code and/or environmental code to display a graphical screen that may be used to assist the user group (140) in downloading the appropriate template to the user group (140). After the template has been downloaded and populated with the necessary user group data, it may then be uploaded to the host computer (110), as described above. After the file is uploaded to the host computer (110), unique object identification codes are generated for each new object, as described below.

Unique object identification codes are assigned to each new object for which data was entered after data is populated in the inputable computerized record fields, either by using the computerized input boxes or by uploading an object data file. The unique object identification code is a uniquely identifying code (e.g., a unique set of alphanumeric characters) that is generated by the application module (150) for each object. The unique object identification code is generally generated in accordance with the data inputted into the inputable computerized record fields. In other words, the unique object identification code includes information corresponding to the predetermined required fields and may also include information corresponding to the user-definable fields. This information is unique for each object and is employed to generate the UID labels. The unique object identification code may also enable generation of UID labels that include data corresponding to information contained in the user-definable fields. Generally, no two unique object identification codes are alike with respect to any user group (140). In other words, only one unique object identification code exists for each object and the unique object identification codes are not repeated across user groups (140).

After unique object identification codes have been created for each object, an object information file may be generated which includes one or more unique object identification codes. The object identification file may be used to generate the UID labels. The object information file may also be used to generate reports based on the data contained in the object information file, including information corresponding with the unique object identification codes.

The object information file is generally in a file format that enables a remote computer (130) to read the file and print UID labels based thereon. In one approach, discussed below, the object information file remains at the host computer (110) and is used to generate UID labels from the host computer (110).

In another embodiment, the object identification file is transferred to the user's computer (130) via a network arrangement (e.g., the Internet, intranet or extranet). The user group (140) may then print the UID labels from their user computer and at their convenience based on the object information file. In another aspect, UID label templates may be employed by the host computer (110) and/or application module (150) to enable the user group (140) to select the appropriate UID label format for the corresponding object. These UID label templates may be defined in size, layout, font, and indicia, among others by a third party (e.g., an object purchaser) and/or a user group (140). The UID label template may be automatically uploaded to the host computer (110) from a remote computer (130), or the requirements for the label template may be sent to the host administrator, who may then implement the requirements on the host computer (110).

Figure 5:
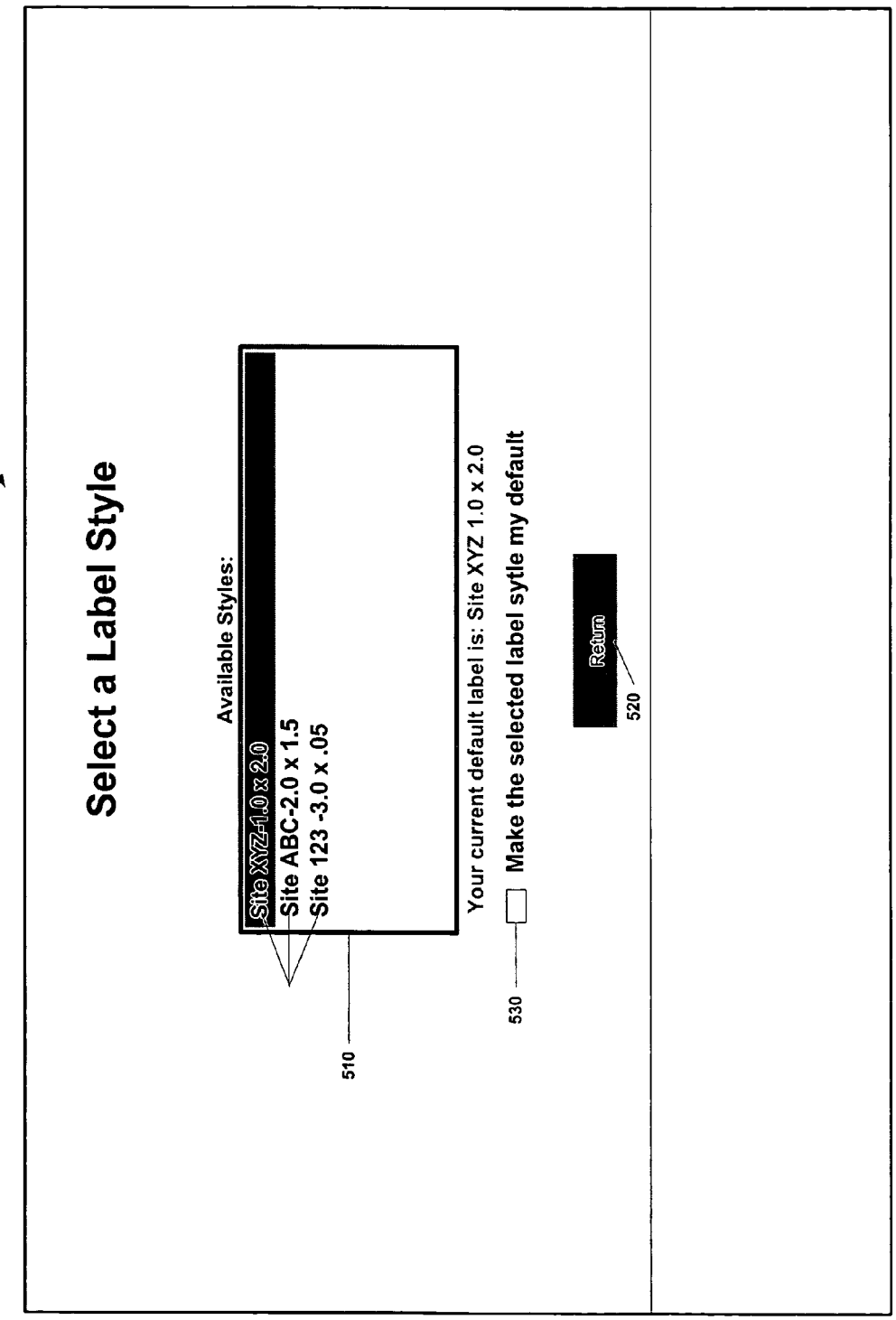
FIG. 5 illustrates one embodiment of a graphical screen employable with the present invention.

The user interface generation module (160) may be employed in this regard to create graphical screens employed to select appropriate label templates. One embodiment of a graphical screen employing such an approach is depicted in FIG. 5. In this regard, a graphical screen (500) may display a label select input box (510) for use in selecting the appropriate UID label templates (515). The user group (140) may also make the selected UID label template the default style by checking the default style check box (530). The selected UID label template (515) and/or the default style check box information (530) is communicated to the host computer (110) by using the Return button (520) (e.g., via pointing and clicking).

In one approach, the unique identification label templates are defined by a third-party, such as an object purchaser. In some instances, it is important for an object purchaser to have uniquely identifying labels that meet certain predetermined requirements. For example, object purchasers may have machine-readable format requirements that must be satisfied for the object purchaser to effectively track the object. Thus, the object purchaser may have more than one unique identification label template available based on its requirement for differing objects and/or user groups. For example, a governmental entity (e.g., the Department of Defense) may require all objects they purchase to have UID labels attached thereto and differing UID label types for differing types of objects. (e.g., see Department of Defense Military Standard Practice, *Identification Marking of U.S. Military Property*, MIL-STD-130, Oct. 10, 2003).

Figure 6:
FIG. 6 illustrates one embodiment of a graphical screen employable with the present invention.

Updating of object data may be accomplished using the user interface generation module (160). In this regard, a graphical screen, such as one similar to that depicted in FIG. 3, may be used to enable the user group to update data. In one embodiment, prior to generating the data input screen (FIG. 3), the user may be prompted to determine whether an addition or update of a uniquely identified object is required. FIG. 6 depicts one example of a user interface that may be generated in this regard. In this approach, after accessing the host computer (110) and/or application module (150), a graphical screen (600) prompts the user to either add or update object information using an add/update object information input toggle (610). Upon selection of the appropriate toggle, data may be sent to the host computer (110) by using the select button (620).

It is also contemplated that automatic object data may be uploaded and/or downloaded to add and/or update data. For example, regular file transfers could be scheduled by the user group (140) and/or host administrator to automatically update and/or add object data to the application module (150) for the specific user group (140).

In another aspect of the present invention, the application module (150) may track which objects have generated UID labels. In one approach, the user group (140) may search the inputable computerized record fields for object-related data to determine which objects have generated UID labels. The user interface generation module (160) may be employed in this aspect to enable the user group (140) to interface with the host computer (110) to conduct such a search. One example of a graphical screen enabling such object search and pending label capabilities is depicted in FIG. 7.

The graphical screen (700) includes a plurality of computerized input boxes (710) that are searchable to retrieve associated object data (720) including unique object identification code data (730). In one aspect, one or more computerized input boxes (710) are populated with data and the lookup button (750) is used to display the objects meeting the designated search criteria (720). Partial data values may be used to search for the requisite objects (e.g., a "234" data input returns all objects containing "234" in the corresponding search field). The computerized input boxes may correspond with predetermined required fields, user-definable fields, and combinations thereof. Various objects meeting the search criteria may be selected, for example using an object select check box (740), to designate the objects for which UID labels are required. An object information file corresponding to the selected objects may be generated by using the print selected labels button (760).

In another embodiment, the UID labels may be generated using the host computer (110). For example, after object data has been added to the application module (150), the user interface generation module (160) may prompt the user group (140) as to whether UID labels are needed at that time. Upon selecting the appropriate option, the user interface generation module (160) may generate the appropriate graphical screen to enable the user group (140) to selectively print the appropriate UID labels using a stored object information file, such as that depicted in FIG. 7.

In one approach, prior to printing the UID labels from the host computer (110), the user group may be prompted to verify that the appropriate UID labels are being printed and in the appropriate format. One graphical screen implementing this approach is depicted in FIG. 8. The label verification graphical screen (800) may include the necessary information to enable the user group (140) to determine whether the appropriate object has been selected for printing, such as unique object identification code (810) and other information. The user group may confirm the generation of the UID label by using the Print Label button (820).

In another embodiment of the present invention, the application module (150) enables the user group (140) to selectively create a data file to send to a third party for use by the third party. In one approach, the user group (140) may selectively search the application module (150) and corresponding inputable computerized record fields for the data requiring submission to the third party. Upon selecting the requisite object data, the data file may be generated by the application module (150). In one approach, the data file is in a well-known/widely-used/non-proprietary format, such as in a spreadsheet, XML, text, or delimited format.

In this regard, the user interface generation module (160) may be used to generate a graphical screen that may be used to display the necessary information to assist the user group in generating the data file. An example of a graphical screen employed in this aspect is depicted in FIG. 9.

The graphical screen (900) includes a plurality of computerized input boxes (910) that are searchable to retrieve associated object data (920) including unique identification code data (930). In one aspect, one or more computerized input boxes (910) are populated with data and the Lookup button (970) is used (e.g., pointed at and clicked on) to display the objects meeting the designated search criteria (925). Partial data values may be used to search for the requisite objects (e.g., a "abc1" data input returns all objects containing "abc1" in the corresponding search field). The computerized input boxes (910) may correspond with predetermined required fields, user-definable fields, and combinations thereof. Various objects meeting the search criteria (920) may be selected, for example using an object select check box (940), to designate the objects for which a data file is required. The user group (140) may select all objects associated with the search criteria or clear all checked objects by checking the appropriate object select check box (990). A data file may be generated using the Create Data File button (970). Optionally, a filter (950), which includes filter toggle buttons (960), may be employed to sort the data according to designated criteria.

After the data file is created, the user group (140) may send the file directly to the object purchaser, or download the file to the remote computer (130) and later submit the data file to the object purchaser. For example, the user group (140) may select to directly e-mail the data file to the object purchaser instead of sending it over the Internet. In one embodiment, an XML file is directly sent to the object purchaser using file transfer protocol ("FTP").

Figure 10:
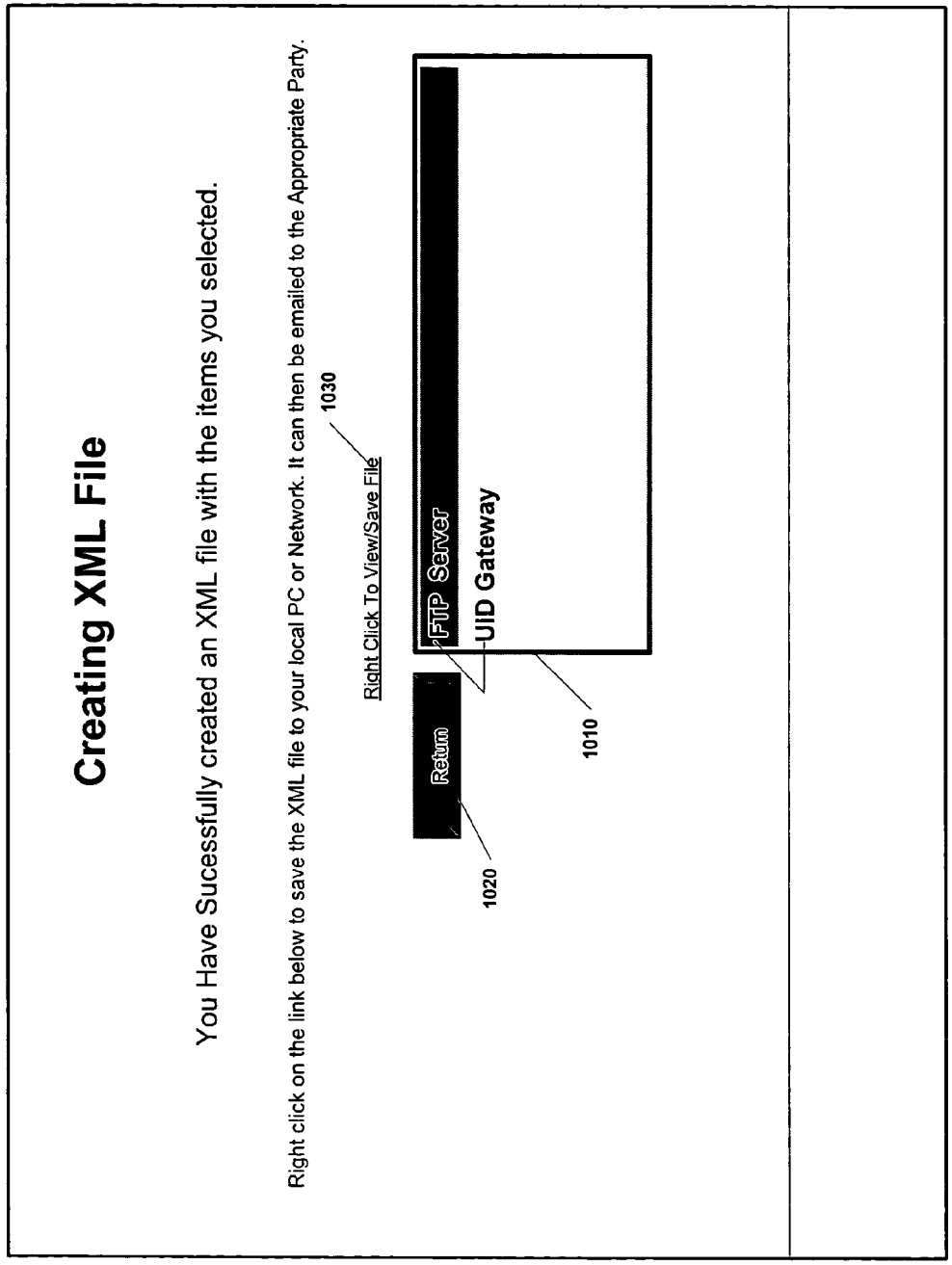
FIG. 10 illustrates one embodiment of a graphical screen employable with the present invention.

In this regard, the user interface generation module (160) may be used to create a graphical screen to assist the user group (140) in selecting where/when/how to send the data file. FIG. 10 is one example of such a graphical screen. The graphical screen (1000) may display a communication method input box (1010) for selecting the appropriate communication method (1015). Upon selection of the appropriate communication method (1015) the user group (140) may send the file to the third party by using the Send button (1020). Alternatively, the user group (140) may download the data file to their remote computer using the download link (1030).

Figure 11:
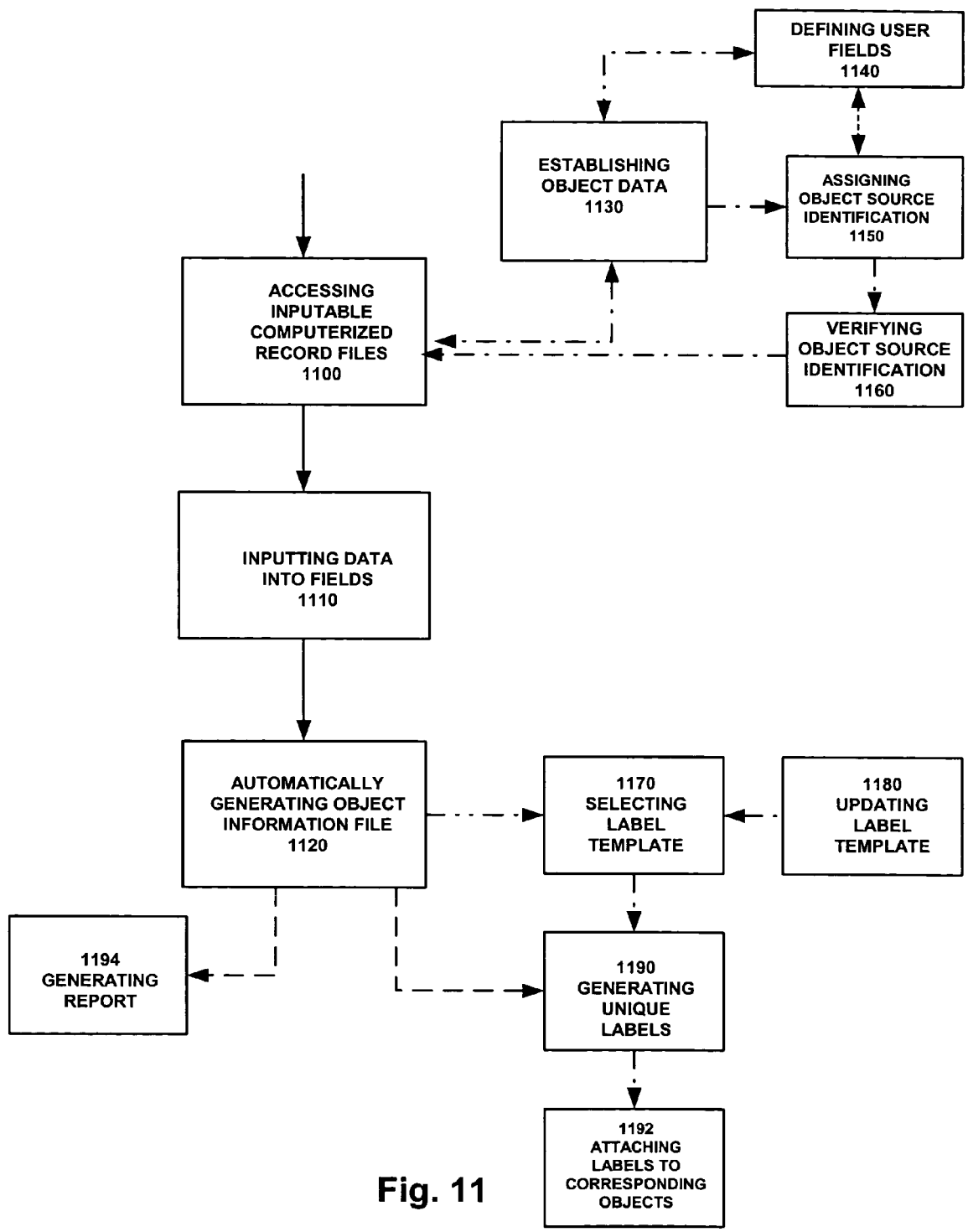
FIG. 11 illustrates a method for practicing the present invention.

The above capabilities, benefits and utility are further recognized with reference to the process depicted in FIG. 11. The process of automatically generating UID labels begins by first accessing the inputable computerized record fields (1100) (e.g. utilizing a remote computer to access a application module). As noted above, the inputable computerized record fields may be a predetermined required field and/or a user-definable field. Data may then be input into at least one of the predetermined required fields and/or user-definable fields (1110) (e.g., entering object data via a graphic screen and transmitting such object data to the host computer) for each of a corresponding one of a plurality of objects. As noted above, the data may be inputted directly by a user or uploaded. After the data has been input into the requisite fields, at least one object information file is automatically generated (1120) (e.g., using the application module and a unique object identification code). As noted above, the object information file is generally employable for generating one or more unique identification labels and the unique identification labels correspond to the plurality of objects.

Optionally, prior to accessing the inputable computerized record fields, the user group may establish the object data protocol (1130) (e.g., mapping predetermined required fields and/or user-definable fields to data employed by an object source). As noted, the object data protocol corresponds with the use of predetermined required fields and user-definable fields. In one aspect, the object data protocol is defined with respect to one or more user-definable fields (1140) (e.g., mapping a user-definable field to data employed by the user group, wherein the data is not employed in the predetermined fields).

As part of the establishing process, the user group may be assigned an object source identifier to enable them to access the computerized record fields (1150) (e.g., setting-up a password and/or an electronic signature). In one approach, the object source identification is verified prior to allowing the user group to access the inputable record fields (1160) (e.g., comparing an inputted password and/or electronic signature to the object source identifier). As described above, the verifying step may include prompting a user for a password and/or verifying an electronic signature (e.g., using the user interface generation module and corresponding graphical screens).

Another aspect of generating UID labels may include selecting a unique identification template (1170) (e.g., selecting a template from the graphical screen generated by the user interface generation module using the user interface generation module). As described above, the UID label template may be defined by a third-party, such as an object purchaser. In another embodiment, the third-party may update the label template (1180) (e.g., by accessing the host computer and uploading the new UID templates). In another embodiment, the object information file may be employed to generate the UID labels (1190) (e.g., sending the object information file to a remote computer for printing at the location of the remote computer). As noted above, the UID labels each correspond to a given one of a set of plurality of objects. The generated UID labels may also be attached to the corresponding object (1192) (e.g., using adhesive labels). The object information file may also be employed to generate a UID report (1194) (e.g., by sending the object information file to a remote computer and interfacing with a report generation program).

In another embodiment, the method may include the steps of establishing the object data protocol separately for each object source, completing the accessing of the application module and the inputting of data steps separately for each object source, and carrying out the automatically generating step separately for each object source. In view thereof, the user-definable fields are defined separately for each object source in relation to a corresponding set of the plurality of objects. The method may further comprise using at least one different user computer with respect to each object source for carrying out the automatic generation step, wherein the user computers are located remote from the host computer. The method may also comprise the step of interconnecting the user computers to the host computer using the Internet.

In another embodiment the user-definable field may be defined by the user group as requiring data entry. In particular, the user group may designate one or more user-definable fields as being required for data entry, and the host computer may provide an indication (e.g., audio or visual) to the user group that such user definable fields are required for data entry. This indication (e.g., audio or visual) may also be used to designate predetermined required fields as well.

Figure 12:
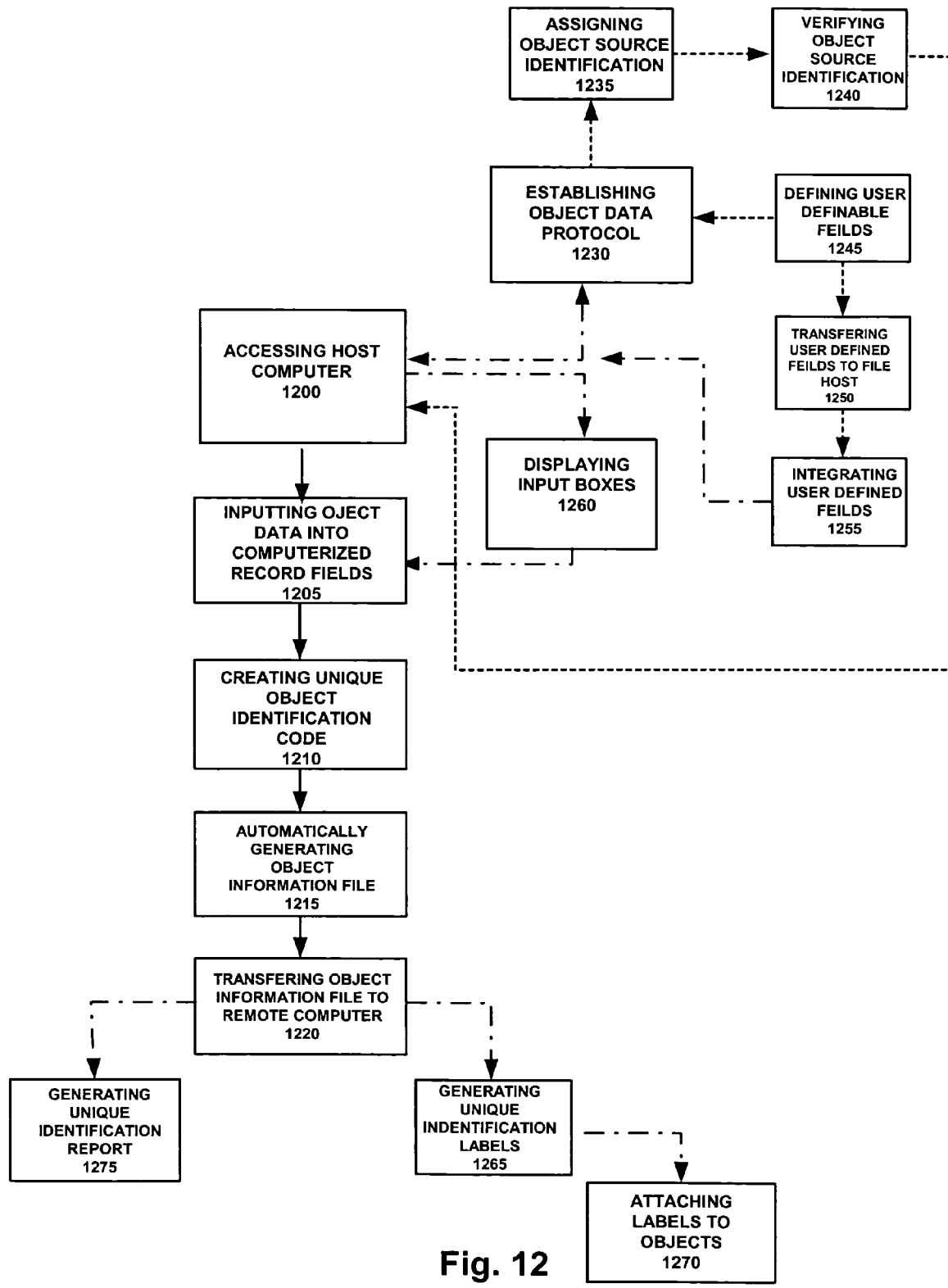
FIG. 12 illustrates a method for practicing the present invention.

One exemplary process for generating UID labels is depicted in FIG. 12. The process includes accessing a host computer by user group (1200) (e.g., via the Internet), after which a user group may input object data (1205) (e.g., via a graphical screen). A unique object identification code is then created (1210) (e.g., via the application module). After the necessary unique object identification codes have been created, an object information file is automatically generated (1215) (e.g., using the application module to generate the file in conjunction with the unique identification codes). The object information file is then transferred to a remote computer (1220) (e.g., using the Internet).

The process may include the step of establishing an object data protocol (1230) (e.g., mapping predetermined required fields and/or user-definable fields to data employed by an object source). The establishing step may also include the step of assigning an object source identifier (1235) (e.g., a password and/or electronic signature) and verifying the object source identification prior to enabling access to the host computer and/or the computerized record fields (1240) (e.g., comparing the inputted password to the stored object source identifier). The establishing step may also include defining the user-definable fields (1245) (e.g., mapping the user-definable fields to data employed by an object source, wherein such data is not used in the predetermined required fields), transferring the user-definable fields to the host computer (1250) (sending over the Internet) and integrating those user-definable fields with the host computer (1255) (e.g., using the application module to incorporate the user-definable field with the predetermined required fields).

The process may also include generating the UID labels based on the object information file (1265) (e.g., printing at the remote computer location). After the UID labels have been generated they may be attached to their corresponding object (1270) (e.g., using adhesive labels). In another aspect, the object information file may also be used to generate a UID report (1275) (e.g., interfacing the object information file with a report generation program).

While various embodiments of the present invention are described herein as requiring a connection between two or more computers, it is contemplated that a single computer could be used in accordance with the method of the present invention. For example, one computer comprising the necessary application module, user interface generation module, database module and user verification module could be employed in accordance with a single user interface. Also, as used herein "user group" means an entity such as an individual, corporation, affiliation, partnership and the like.

Moreover, while various embodiment have been described with the object purchaser defining the predetermined required fields, indicia for the uniquely identifying labels and other associated aspects, and the object source defining any user-definable fields, any second indicia and other associated aspects, it is contemplated that the methods and systems disclosed herein could be employed in reverse orientation. That is, the object source could define the predetermined required fields, the indicia for the uniquely identifiable labels, and other associated aspects, and the object purchaser or other third-party could define any user-definable fields, and second indicia and any other corresponding aspect.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for automatic generation of a unique identification label for each of a plurality of objects for supply from a supplier to a purchaser, said method employing a plurality of computerized record fields defined by an object data protocol, said method comprising:

receiving a predetermined purchaser-required field from a purchaser as a first one of said plurality of computerized record fields defined by said object data protocol;

defining, by a supplier, a supplier-definable field as a second one of said plurality of computerized record fields defined by said object data protocol;

accessing said plurality of computerized record fields defined by said object data protocol after said receiving and defining steps;

inputting data into said first and second ones of said plurality of computerized record fields defined by said object data protocol, accessed in said accessing step, in corresponding relation to each of said plurality of objects;

automatically generating, after completion of said receiving, defining, accessing and inputting steps, at least one object information file employable for generating a plurality of unique identification labels in corresponding one-to-one relation to said plurality of objects, wherein said at least one object information file comprises a plurality of first object identification codes, each of said plurality of first unique object identification codes corresponding to said data inputted into said first and second ones of said plurality of computerized record fields defined by said object data protocol for a corresponding one of said plurality of objects, wherein said at least one object information file further comprises a plurality of second unique object identification codes, each of said plurality of second unique object identification codes corresponding to said data inputted into said supplier-definable field for a given one of said plurality of objects, and wherein each of said plurality of second unique object identification codes is different than said each of said plurality of first unique object identification codes; and;

generating said plurality of unique identification labels based on said object information file, wherein each of said plurality of unique identification labels comprises a first indicia, wherein each first indicia of said plurality of unique identification labels is unique for each of said plurality of unique identification labels.

2. The method of claim 1, further comprising:
establishing said object data protocol separately for each of a plurality of object sources, wherein each object source is at least one of a division of said supplier and an affiliate of said supplier.

3. The method of claim 2, further comprising:
assigning an object-source ID to each of said plurality of object sources; and, wherein said accessing step further comprises:
verifying said object-source ID prior to said inputting and automatically generating steps.

4. The method of claim 3, wherein said object-source ID is an electronic signature.

5. The method of claim 1, wherein said supplier-definable field is established for the input of at least one of the following types of object information:
object manufacturer identification information, object manufacturing engineering division information, object purchasing contract information, object data universal numbering system information, object-purchaser object acceptance information, object lot number information, and object shipping information.

6. The method of claim 1, further comprising:
establishing said object data protocol separately for each of a plurality of object sources, wherein each object source is at least one of a division of said supplier and an affiliate of said supplier;
completing said defining, accessing, and inputting steps separately for each of said plurality of object sources; and,
carrying out said automatically generating step separately for each of said plurality of object sources.

7. The method of claim 6, wherein said defining step comprises:
defining said supplier-definable field separately for each of said plurality of object sources in relation to corresponding sets of said plurality of objects.

8. The method of claim 7, wherein for each of said plurality of object sources said defining step is completed before said accessing step.

9. The method of claim 6, wherein said completing step comprises:
using at least one different user computers in corresponding relation to each of said plurality of object sources; and,
wherein said carrying out step comprises:
employing at least one host computer in relation to all of said plurality of object sources, said user computers being remotely located from said at least one host computer.

10. The method of claim 9, further comprising:
interconnecting each of said user computers to said at least one host computer via the Internet.

11. The method of claim 1, further comprising:
designating said supplier-definable field as another required field.

12. The method of claim 11, further comprising:
providing an indication to a user as to the required nature of said predetermined required field and said another required field in conjunction with said inputting step.

13. The method of claim 1, wherein said inputting step comprises:
uploading data from a user computer to a host computer.

14. The method of claim 1, wherein each first indicia of said plurality of unique identification labels corresponds to a given one of said plurality of said second unique object identification codes.

15. The method of claim 1, wherein each first indicia of said plurality of unique identification labels corresponds to a given one of said plurality of first unique object identification codes and a given one of said plurality of second unique object identification codes.

16. The method of claim 1, wherein each of said plurality of unique identification labels further comprises a second indicia, wherein each second indicia of said plurality of unique identification labels is unique for each of said plurality of unique identification labels, wherein each first indicia of said plurality of unique identification labels corresponds to a given one of said plurality of said first unique object identification codes, and wherein each second indicia of said plurality of unique identification labels corresponds to a given one of said plurality of second unique object identification codes.

17. The method of claim 1, wherein said predetermined purchaser-required field is established for the input of at least one of a type of object information, said type of object information selected from a group comprising: supplier identifier information, object serial number information, object part number information, object revision number information, object work order information, and object description information.

18. The method of claim 1,
wherein each first indicia of said plurality of unique identification labels corresponds to a given one of said plurality of first unique object identification codes.

19. The method of claim 18, wherein said first indicia is in a machine readable format.

20. The method of claim 18, further comprising:
selecting, prior to said generating step, a first label template, wherein said first label template defines at least a portion of said first indicia.

21. The method of claim 20, wherein said first label template is defined by said purchaser.

22. The method of claim 21, further comprising:
updating said first label template based on requirements of a given object purchaser to create an updated label template, wherein said updated label template defines an updated indicia, wherein said updated indicia is different than said first indicia.

23. The method of claim 22, wherein said updated label template does not comprise said first indicia.

24. The method of claim 18, further comprising:
attaching each of said generated plurality of unique identification labels to each of a corresponding one of said plurality of objects.

25. The method of claim 1, further comprising:
generating a report using said object information file, wherein said report comprises information based on at least one of said plurality of first unique object identification codes.

26. The method of claim 1, wherein said inputting step comprises:
uploading data from a user computer to a host computer.

27. A method for generating a plurality of unique identification labels using a network arrangement, the method comprising:
accessing a host computer from a user computer using a network arrangement, wherein said user computer is located remote from said host computer;
inputting data, corresponding with a plurality of objects, into at least one of a plurality of computerized input fields at said user computer, wherein said inputted data corresponds to information employed by an object supplier to identify each of said plurality of objects by said object supplier;
creating a unique object identification code at said host computer for each of said plurality of objects based on said inputted data;
automatically generating, after completion of said inputting step, at least one object information file on said host computer, said at least one object information file comprising information corresponding to said unique object identification code and being employable for generating a plurality of unique identification labels for a corresponding plurality of objects, wherein said plurality of unique identification labels comprises an indicia at least partially defined by an object purchaser, wherein said indicia is employed to uniquely identify each of said plurality of objects by at least said object purchaser;
establishing an object data protocol separately for each of a plurality of said object suppliers, wherein each said object data protocol comprises the use of said plurality of computerized input fields, and wherein said plurality of computerized input fields comprise a plurality of predetermined purchaser-required fields and one or more supplier-definable fields; and defining said one or more supplier-definable fields separately for each of said plurality of said object suppliers in relation to corresponding sets of said plurality of objects, wherein a set of said one or more supplier-definable fields corresponds with data employed by a corresponding one of said plurality of object suppliers to identify said corresponding sets of said plurality of objects, and wherein said defining step is completed before said inputting step.

28. The method of claim 27, further comprising:

accessing an object supplier ID corresponding with said object supplier; and verifying said object supplier ID before said inputting data step.

29. The method of claim 28, wherein said object supplier ID is an electronic signature.

30. The method of claim 27, further comprising:

generating said plurality of unique identification labels based on said object information file, wherein each of said plurality of unique identification labels comprising a first indicia, wherein each first indicia of said plurality of unique identification labels is unique for each of said plurality of unique identification labels, and wherein each first indicia of said plurality of unique identification labels corresponds to a given one of said plurality of unique object identification codes.

31. The method of claim 30, further comprising:

attaching each of said generated plurality of unique identification labels to different corresponding ones of said plurality of objects.

32. The method of claim 27, further comprising:

changing said indicia to create an updated indicia; and uploading said updated indicia to said host computer.

33. The method of claim 27, further comprising:

generating a report using said object information file, wherein said report comprises information based on at least one of said plurality of unique object identification codes.

34. The method of claim 27, further comprising:

transferring information corresponding to information contained in the at least one object identification file to said user computer using said network arrangement to generate said plurality of uniquely identifying labels.

35. The method of claim 27, further comprising:

transmitting, prior to said creating step, said inputted data from said user computer to said to host computer using said network arrangement.

36. The method of claim 27, wherein said network arrangement comprises the Internet.

37. The method of claim 27, wherein each said object data protocol defines at least a portion of a computerized graphical screen.

38. The method of claim 27, wherein each said object data protocol defines a separate graphical screen for use by each of said plurality of object suppliers.

39. The method of claim 27, wherein said inputting step further comprises:

a first entering of data into at least one of said plurality of predetermined required fields; and a second entering of data into at least one of said at least one user-definable fields.

40. The method of claim 39, further comprising:

completing said accessing and first entering steps separately for each of said plurality of object suppliers; and carrying out said automatically generating step separately for each of said plurality of object suppliers.

41. The method of claim 40, wherein said completing step further comprises:

effecting said second entering steps separately for each of said plurality of object suppliers.

42. The method of claim 27, wherein said inputting step comprises:

using a plurality of computerized input boxes, wherein a first one of said computerized input boxes corresponds to a first one of said plurality of predetermined required fields.

43. The method of claim 42, wherein a second one of said computerized input boxes corresponds to a first one of said one or more user-definable fields.

44. The method of claim 27, wherein said inputting step comprises:

uploading data into at least one of said plurality of predetermined required fields.

45. The method of claim 44, wherein said inputting step comprises:

uploading data into at least one of said at least one user-definable fields.

46. The method of claim 27, further comprising:

designating at least one of said user-definable fields as another required field.

47. The method of claim 46, further comprising:

providing an indication to the user as to the required nature of at least one of said predetermined required fields and said another required field in conjunction with said inputting step.

48. The method of claim 27, further comprising:

defining said user-definable fields at said user computer to create a user definition file;

transferring said user definition file to the host computer using a network arrangement; and integrating the user definition file with at least one of said plurality of inputable computerized record fields to create said object data protocol.

49. The method of claim 27, wherein said user computer is associated with said object supplier.

* * * * *

UNITED STATES PATENT AND TRADEMARK OFFICE
CERTIFICATE OF CORRECTION

PATENT NO. : 7,606,831 B2 Page 1 of 1
APPLICATION NO. : 10/919046
DATED : October 20, 2009
INVENTOR(S) : Quinn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 389 days.

Signed and Sealed this

Twelfth Day of October, 2010

David J. Kappos
*Director of the United States Patent and Trademark Office*